United States Patent
Chikuma

(10) Patent No.: US 7,315,506 B2
(45) Date of Patent: Jan. 1, 2008

(54) INFORMATION RECORDING MEDIUM, INFORMATION RECORDING APPARATUS, INFORMATION RECORDING METHOD, INFORMATION PLAYBACK APPARATUS, INFORMATION PLAYBACK METHOD, RECORDING PROGRAM RECORDING MEDIUM, AND PLAYBACK PROGRAM RECORDING MEDIUM

(75) Inventor: Kiyofumi Chikuma, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 530 days.

(21) Appl. No.: 10/901,303

(22) Filed: Jul. 29, 2004

(65) Prior Publication Data

US 2005/0036421 A1  Feb. 17, 2005

(30) Foreign Application Priority Data

Jul. 30, 2003  (JP)  ............................ P2003-203902

(51) Int. Cl.
  *G11B 7/00* (2006.01)
(52) U.S. Cl. ..................................................... 369/126
(58) Field of Classification Search ............. 369/275.3, 369/275.2, 275.4, 126
  See application file for complete search history.

(56) References Cited

U.S. PATENT DOCUMENTS 4,927,681 A  5/1990  Chikuma
5,063,556 A  11/1991  Chikuma
6,309,729 B1 *  10/2001  Glushko et al. ........... 428/64.1
6,515,956 B2 *  2/2003  Tamada ................... 369/112.17

FOREIGN PATENT DOCUMENTS

JP   2-50328 A   2/1990
JP   7-72567 A   3/1995

\* cited by examiner

*Primary Examiner*—Nabil Hindi
(74) *Attorney, Agent, or Firm*—Sughrue Mion Pllc.

(57) ABSTRACT

An optical disk from which information is played back when the optical disk is irradiated with a playback light beam which does not pass through a photochromic layer before its transparency is changed by irradiation with a recording light beam, but passes through the photochromic layer after its transparency is changed, including: the photochromic layer which is initialized with initialization light and also maintains a change in its transparency caused by irradiation with a recording light beam after end of the irradiation; and a fluorescent layer for emitting, as detection light, light of a frequency different from the frequency of the playback light beam when the fluorescent layer is irradiated with the playback light beam, wherein the photochromic layer and the fluorescent layer are formed in order in the direction in which the recording light beam and the playback light beam are irradiated.

11 Claims, 3 Drawing Sheets

INFORMATION RECORDING MEDIUM, INFORMATION RECORDING APPARATUS, INFORMATION RECORDING METHOD, INFORMATION PLAYBACK APPARATUS, INFORMATION PLAYBACK METHOD, RECORDING PROGRAM RECORDING MEDIUM, AND PLAYBACK PROGRAM RECORDING MEDIUM

BACKGROUND OF THE INVENTION

1. Field of the Invention

The present invention relates to technical fields of an information recording medium, an information recording apparatus, an information recording method, an information playback apparatus, an information playback method, a recording program recording medium, and a playback program recording medium. More particularly, the invention relates to technical fields of an information recording medium to/from which information is optically recorded/played back, an information recording apparatus, an information recording method, and a recording program recording medium for optically recording information to the information recording medium, and an information playback apparatus, an information playback method, and a playback program recording medium for optically playing back information recorded on the information recording medium.

2. Description of Related Art

In recent years, an optical disk of high recording density such as so-called DVD (Digital Versatile Disc) is becoming common. Concretely, not only a playback-only DVD but also a recordable DVD are becoming common.

On the other hand, recently, an optical disk which has realized higher recording density by using a so-called blue laser is being practically used. Improvement in recording density of such an optical disk is increasing demand.

The spatial frequency is widely used as a scale indicative of recording density of an optical disk. The spatial frequency is defined as "an amount expressing fineness of an image of a series of lines at equal intervals or sine waves or a cyclic structure of an object" and is a physical amount expressed by the number of cycles per unit length. In the case of applying the spatial frequency to an optical disk, the spatial frequency is a parameter indicative of the size (fineness) of a pit formed in the optical disk.

In the case of optical information recording/playback using an optical disk, the spatial frequency is determined by the wavelength of a light beam for reproduction with which the optical disk is irradiated, and the numerical aperture of an objective lens for focussing the light beam onto the optical disk.

On the other hand, as a technique of effectively increasing the spatial frequency determined by the wavelength of the light beam and the numerical aperture of an objective lens more than a value determined by the actual wavelength and the numerical aperture, techniques of so-called super-resolution are known. Among them, a fluorescent super resolution technique using a phosphor as a recording layer on an optical disk is known (refer to, for example, from line 1 of the upper right column to line 14 of the lower right column of page 3 in Japanese Patent Application Laid-Open (JP-A) No. H02-050328). The disclosures of the corresponding U.S. Pat. Nos. 4,927,681 and 5,063,556 are incorporated by reference in their entirety. A fluorescent super-resolution image is formed by forming the pit on an optical disk by using a phosphor which emits light when being irradiated with a playback light beam in an attempt to increase the effective spatial frequency at the time of irradiation of the light beam by about twice.

On the other hand, as another method of increasing the spatial frequency, a method of effectively decreasing the size of an irradiation area of a light beam (light spot) focused on a recordable optical disk at the time of forming a pit by irradiating the optical disk with a recording light beam to thereby reduce the physical size itself of the pit has been also developed. One method includes a super-resolution technique using a photochromic layer as a cover layer (refer to, for example, JP-A No. H07-072567 (for example, paragraphs "0010" to "0020" and FIG. 5)). In the super-resolution technique using the photochromic layer, the photochromic layer functions as a small aperture to a playback light beam, the diameter of a light spot formed on an optical disk by the playback light beam becomes equivalently smaller and, as a result, information recording/playback of high recording density can be achieved.

In the above-mentioned conventional super-resolution technique using the photochromic layer, however, the photochromic layer itself does not have the function of carrying information, so that a recording layer for carrying information need to be provided so as to be stacked on the photochromic layer. As a result, a pit corresponding to information to be recorded need to be formed in the recording layer by using a recording light beam which passes through the photochromic layer and reaches the recording layer at the time of recording information.

In contrast, the photochromic layer in the super-resolution technique has the functions of changing energy density distribution of a recording light beam, and the light transmitting characteristic of increasing the transmission rate and saturating the transmission rate, thereby equivalently reducing the size of a light spot. When a light beam for recording passes through the photochromic layer itself, a so-called light absorbing phenomenon occurs. The intensity of a light beam for recording reaching the recording layer therefore decreases. Consequently, to complete recording of information, a light beam for recording having a high recording power need to be used.

The above problem causes complication of the configuration of the information recording apparatus, and increase in the manufacturing cost.

Also, at the time of playing back information recorded in the recording layer, the light transmission characteristic of the photochromic layer is changed by irradiation of the light beam for playback, and the recorded information to be played back with deterioration.

Further, in the case of playing back information recorded in the recording layer by detecting, for example, a change in the polarization angle of a playback light beam emitted to the recording layer, the photochromic layer functions as a small aperture. In this case as well, however, a playback light beam having proper intensity, which does not destroy a pit for carrying information formed in the recording layer need to be used. As a result, stability and reliability at the time of playing back information become insufficient.

The invention has been achieved in consideration of the above problem, and an object of the invention is, for example, to provide an information recording medium capable of recording information at recording density higher than that in the conventional technique, and improving stability and reliability at the time of playing back recorded information, and an information recording apparatus, an information recording method, and a recording program recording medium for optically recording information onto the information recording medium, and an information playback apparatus, an information playback method, and a playback program recording medium for optically playing back information recorded on the information recording medium.

SUMMARY OF THE INVENTION

The invention according to claim 1 relates to an information recording medium on which information is recorded by irradiation of a recording light beam for information recording, and from which said recorded information is played back by irradiation of a playback light beam for information playback which does not pass through a transparency changing layer before its transparency is changed by irradiation of said recording light beam, but passes through the transparency changing layer after its transparency is changed, comprising:

said transparency changing layer whose transparency to said playback light beam increases as energy of the recording light beam increases in correspondence with an energy distribution in the direction perpendicular to an optical axis in the recording light beam when said transparency changing layer is irradiated by said recording light beam together with a control light beam for controlling a change in the transparency of said transparency changing layer, and whose changed transparency to said playback light beam is also maintained after end of the irradiation with said recording light beam; and a light emission layer for emitting, as detection light, light of a frequency different from the frequency of the playback light beam when being irradiated with said playback light beam, wherein said transparency changing layer and said light emission layer are formed in order from the side irradiated with said recording light beam and said playback light beam.

The invention according to claim 2 relates to an information recording medium on which information is recorded by irradiation of a recording light beam for information recording, and from which said recorded information is played back by irradiation of a playback light beam for information playback which passes through a transparency changing layer before its transparency is changed by irradiation of said recording light beam but does not pass through the transparency changing layer after its transparency is changed, comprising:

said transparency changing layer whose transparency to said playback light beam decreases as energy of the recording light beam increases in correspondence with an energy distribution in the direction perpendicular to an optical axis of the recording light beam when said transparency changing layer is irradiated by said recording light beam together with a control light beam for controlling a change in the transparency of said transparency changing layer, and whose changed transparency to said playback light beam is also maintained after end of the irradiation with said recording light beam; and a light emission layer for emitting, as detection light, light of a frequency different from the frequency of the playback light beam when being irradiated with said playback light beam, wherein said transparency changing layer and said light emission layer are formed in order from the side irradiated with said recording light beam and said playback light beam.

The invention according to claim 6 relates to an information recording apparatus for recording information onto an information recording medium according to claim 1, comprising:

a modulating device which modulates intensity of said recording light beam on the basis of information to be recorded;

a first light emitting device which irradiates a position on said information recording medium on which said information is to be recorded with said control light beam in order to change transparency of said transparency changing layer formed in the position; and a second light emitting device which irradiates said transparency changing layer irradiated with said control light beam with said recording light beam whose intensity has been modulated.

The invention according to claim 7 relates to an information playback apparatus for playing back information recorded on an information recording medium according to claim 1, comprising:

a light emitting device which emits said playback light beam to said light emission layer in the position on said information recording medium in which said information to be played back is recorded, said playback light beam passing through said transparency changing layer;

a detecting device which receives said detection light generated from said light emission layer irradiated with said playback light beam, and generates a detection signal; and a playback device which plays back said recorded information on the basis of said generated detection signal.

The invention according to claim 8 relates to an information recording method for recording information onto an information recording medium according to claim 1, comprising:

a modulating process of modulating intensity of said recording light beam on the basis of information to be recorded;

a first light emitting process of irradiating a position on said information recording medium on which said information is to be recorded with said control light beam in order to change transparency of said transparency changing layer formed in the position; and a second light emitting process of irradiating said transparency changing layer irradiated with said control light beam by said recording light beam whose intensity has been modulated.

The invention according to claim 9 relates to an information playback method for playing back information recorded on an information recording medium according to claims 1, comprising:

a light emitting process of emitting said playback light beam to said light emission layer in the position on said information recording medium in which said information to be played back is recorded, said playback light beam passing through said transparency changing layer;

a detecting process of receiving said detection light generated from said light emission layer irradiated with said playback light beam, and generating a detection signal; and a playback process of playing back said recorded information on the basis of said generated detection signal.

The invention according to claim 10 relates to an information recording medium on which a program is recorded so that it can be read by a computer, said program being a recording program for causing a recording computer included in an information recording apparatus for recording information onto an information recording medium according to claim 1 to function as:

a modulating device which modulates intensity of said recording light beam on the basis of information to be recorded;

a first light emitting device which irradiates a position in said information recording medium on which said information is to be recorded with said control light beam in order to change transparency of said transparency changing layer formed in the position; and a second light emitting device which irradiates said transparency changing layer irradiated with said control light beam with said recording light beam whose intensity has been modulated.

The invention according to claim 11 relates to an information recording medium on which a program is recorded so that it can be read by a computer, said program being a playback program for causing a playback computer included in an information playback apparatus for playing back information recorded on an information recording medium according to claims 1 to function as:

a light emitting device which emits said playback light beam to said light emission layer in the position on said information recording medium in which said information to be played back is recorded, said playback light beam passing through said transparency changing layer;

a detecting device which receives said detection light generated from said light emission layer irradiated with said playback light beam, and generates a detection signal; and a playback device which plays back said recorded information on the basis of said generated detection signal.

BRIEF DESCRIPTION OF THE DRAWINGS

FIGS. 2A and 2B are diagrams for explaining the principles of recording of information, and FIG. 2C is a diagram for explaining the principles of playback of information.

DESCRIPTION OF THE PREFERRED EMBODIMENTS

Preferred embodiments of the invention will now be described with reference to the drawings.

The following embodiment relates to the case of applying the invention to an optical pickup included in an information recording and playback apparatus for optically recording and playing back information to/from an optical disk according to the invention.

1. Principles of the Invention and Embodiment of Information Recording Medium

Figure 1:
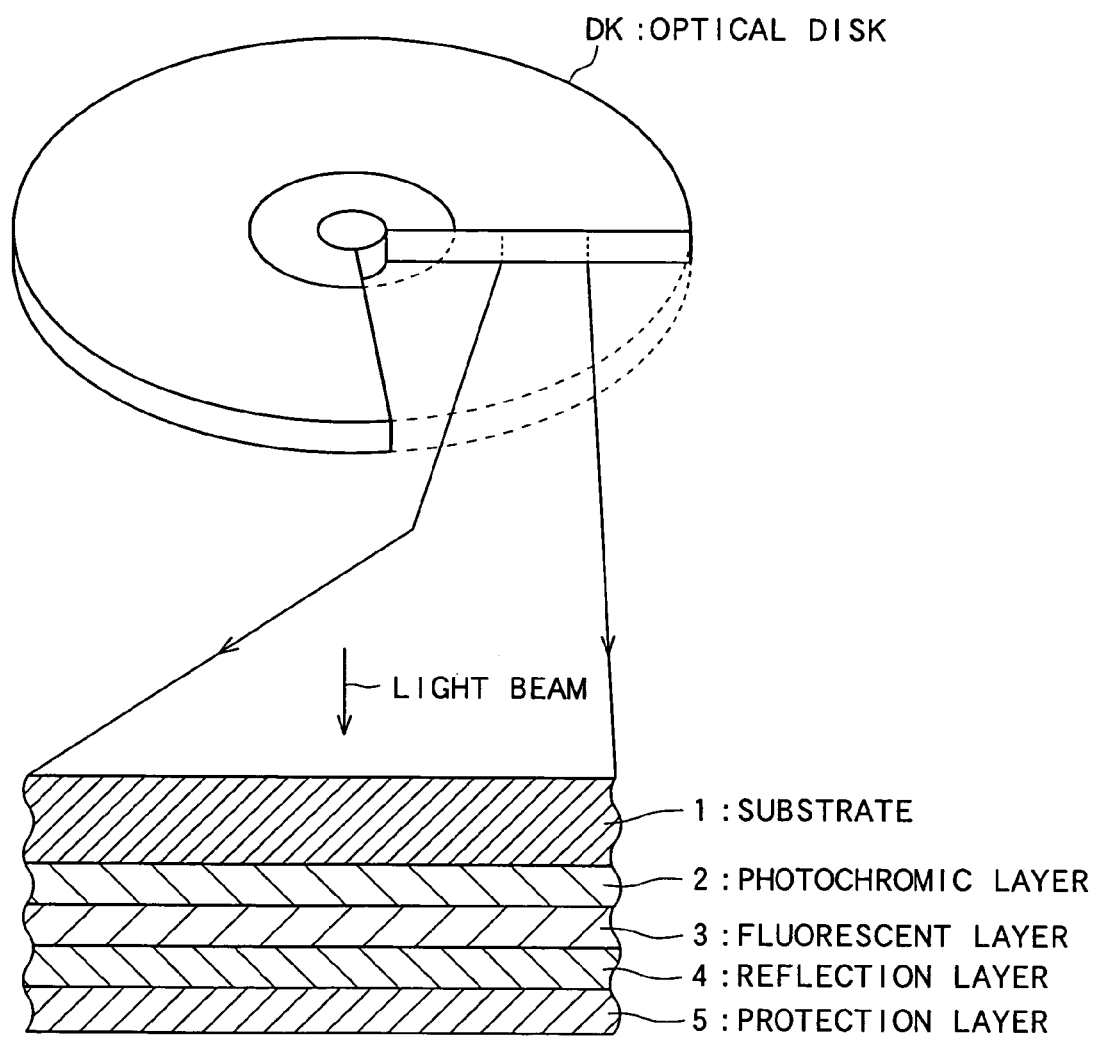
FIG. 1 is a diagram showing the configuration of an optical disk of an embodiment.
Figure 2:
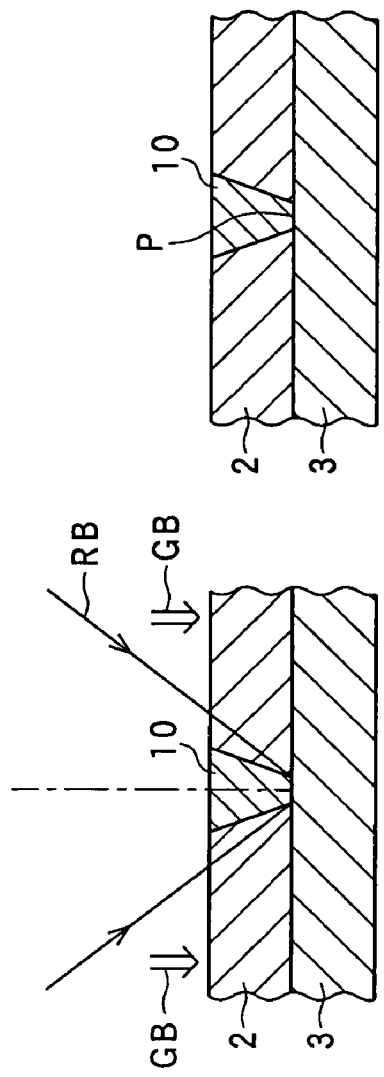
FIGS. 2A, 2B, and 2C are diagrams for explaining the principles of the invention.

First, an embodiment of an optical disk as an information recording medium according to the invention will be described together with the principles of the invention with reference to FIG. 1 and FIGS. 2A, 2B, and 2C. FIG. 1 is a diagram showing the configuration of the optical disk, and FIGS. 2A, 2B and 2C are diagrams for explaining the principles of the invention.

As shown in FIG. 1, an optical disk DK of the embodiment has a disc form in which layers for recording information are stacked. Concretely, from the side to be irradiated with a light beam or the like used for recording/playing back information to/from the optical disk DK, a substrate 1, a photochromic layer 2 as an example of a transparency changing layer, a fluorescent layer 3 as an example of a light emission layer, a reflection layer 4, and a protection layer 5 are stacked in order.

In the configuration, the substrate 1 functions as a base material of the optical disk DK.

The functions and the like of the photochromic layer 2 and the fluorescent layer 3 will be described in detail later together with the principles of the invention.

As a concrete material of the photochromic layer 2, generally, a material called a photochromic material is used. For example, any material can be used as long as the material has a gate function capable of recording information only when the material is irradiated with a control beam, and can be formed thinly (for more concrete information, refer to the above-mentioned JP-A No. H07-072567). In this case as well, however, the material need to have a characteristic such that the higher the energy is in correspondence with an energy distribution in the direction perpendicular to the optical axis of a recording light beam to be described later, the more the transparency to a playback light beam to be described later increases.

On the other hand, as a concrete material of the fluorescent layer 3, generally, a photoluminescence material or a material called a fluorescent dye which can be formed in a thin film can be used (for more concrete information, refer to the above-mentioned JP-A No. H02-050328). In this case as well, however, the material need to have a characteristic of generating detection light having a desired wavelength by irradiation of a playback light beam, which will be described later.

Further, the reflection layer 4 has the function of reflecting the light beam and the like emitted from the substrate 1 side, and concretely, is formed by an aluminum vapor-deposition film, an Au (gold) vapor-deposition film, or the like.

Finally, the protection layer 5 has the function of protecting the photochromic layer 2 and the fluorescent layer 3 from the protection layer 5 side.

The functions of the photochromic layer 2 and the fluorescent layer 3 will be described together with the principles of the invention with reference to FIGS. 2A, 2B, and 2C.

First, the principles of the case of optically recording information onto the optical disk DK shown in FIG. 1 will be described.

In the optical disk DK shown in FIG. 1, the photochromic layer 2 displays a function similar to that of the photochromic layer used for the optical disk in the above-mentioned JP-A No. H07-072567. Concretely, the photochromic layer 2 functions as a small aperture which effectively reduces the size of a light spot formed by a recording light beam on the optical disk DK at the time of information recording, and functions as a small aperture to a playback light beam by reducing the size of the light spot formed by a playback light beam on the fluorescence layer 3 at the time of reproduction of the recorded information mentioned later.

Specifically, as shown in FIG. 2A, at the time of information recording, first, a position of recording the information on the optical disk DK is irradiated with a gate beam GB (having a wavelength of, preferably, 780 to 650 nm, for example) as a control beam for changing the characteristic of the photochromic layer 2, and a recording light beam RB (having a wavelength of, preferably, 410 nm or less, for example) whose intensity is modulated according to the information. At this time, the recording light beam RB is condensed by a not-shown objective lens so that the focal point is achieved near the surface of the fluorescent layer 3 (the surface in contact with the photochromic layer 2) corresponding to the recording position.

When the photochromic layer 2 is irradiated with the recording light beam RB as shown in FIG. 2A, as described in JP-A No. H07-072567, the higher the energy is in correspondence with the distribution of energy in the direction perpendicular to the optical axis of the recording light beam RB, the higher the transparency to the playback beam of the photochromic layer 2 becomes. Consequently, as shown in FIG. 2A, a transparency region 10 having an inverted cone shape is formed in the photochromic layer 2 around the optical axis of the emitted recording light beam RB as a center. Since the shape of the transparency region 10 is the inverted cone shape having the apex toward the fluorescent layer 3 (downward in FIG. 2A), the size of light spot formed in the surface of the fluorescent layer 3 when the playback light beam emitted toward the fluorescence layer 3 at the time of information playback to be described later passes through the transparency region 10, and reaches the surface of the photochromic layer 2 side of the fluorescent layer 3, corresponds to the size of the apex portion of the transparency changing region 10.

After that, when emission of either the recording light beam RB or the gate beam GB is stopped, as shown in FIG. 2B, only the transparency region 10 is formed in the photochromic layer 2. At this time, the size of the apex portion of the transparency region 10 is smaller than that of light spot formed in the surface of the photochromic layer 2 of the recording light bean RB itself. Further, as will be described later, in the invention, the photochromic layer 2 itself is opaque to the playback light beam, and the transparency region 10 is transparent to the playback light beam. As a result, information can be recorded at the spatial frequency higher than the cut-off frequency determined by the wavelength of the playback light beam and the numerical aperture of the objective lens.

As the information pit in the invention, the portion in the fluorescent layer 3 corresponding to the apex of the transparency region 10 shown in FIG. 2B corresponds to an information pit P.

The principles of the case of playing back information from the optical disk DK in which the information bit P is formed in the state shown in FIG. 2B will be described by using FIG. 2C.

As shown in FIG. 2C, at the time of information playback, the position on the optical disk DK in which the information pit P is formed is irradiated with the reproduction light beam PB (whose wavelength is preferably, for example, 410 nm or less similar to that of the recording light beam RB). At this time, the gate beam GB emitted at the time of recording information is not emitted.

When the emitted playback light beam PB passes through the transparent region 10, and reaches the fluorescent layer 3, the fluorescent layer 3 is excited by the playback light beam PB. Consequently, by the fluorescent super-resolution phenomenon similar to that described in JP-A No. H02-050328, information recorded as the information pit P is optically detected as detection light L, and the information is played back.

(II) Embodiment

Figure 3:
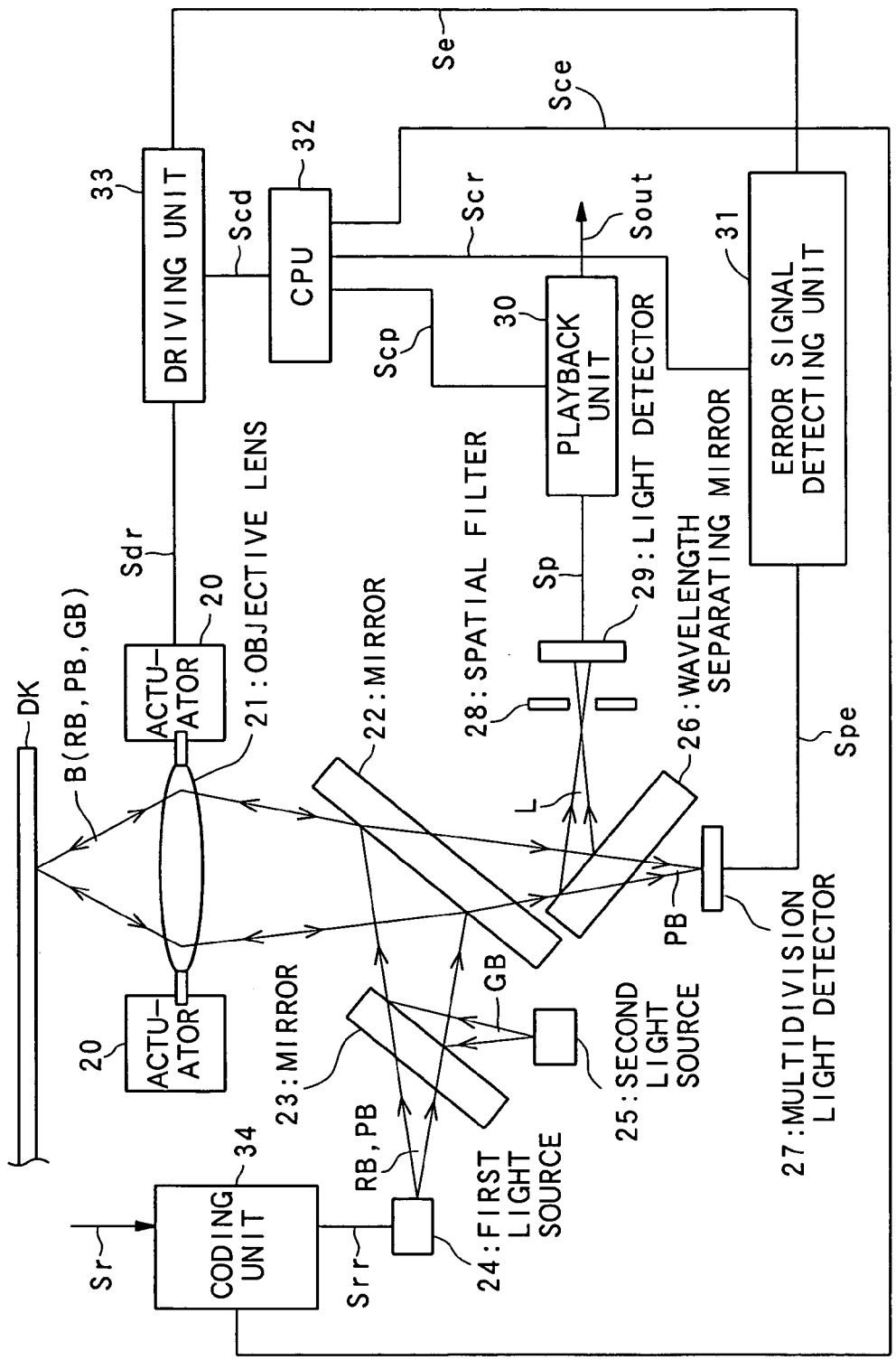
FIG. 3 is a block diagram showing a schematic configuration of an information recording and playback apparatus according to the embodiment.

An embodiment of the invention based on the above-mentioned principles will now be described with reference to FIG. 3. FIG. 3 is a block diagram showing a schematic configuration of an information recording/playback apparatus according to the embodiment.

As shown in FIG. 3, an information recording/playback apparatus S of the embodiment for optically recording/playing back information to/from the optical disk DK of the invention includes: an objective lens 21 fixed to an actuator 20; mirrors 22 and 23; a first light source 24 as a light emitting device or a second light emitting device for emitting the recording light beam RB (at the time of recording information) and the playback light beam PB (at the time of playing back information) having a wavelength of 410 nm or less; a second light source 25 as a first light emitting device for emitting the gate light beam GB having a wavelength of 780 nm to 650 nm; a wavelength separating mirror 26; a multidivision light detector 27 which is divided in, for example, four parts; a spatial filter 28; a light detector 29 as a single detector which is not divided; a playback unit 30 as a playback device; an error signal detecting unit 31; a CPU 32; a driving unit 33; and a coding unit 34 as a modulating device.

The mirror 23 has optical characteristics of transmitting the recording light beam RB and the playback light beam PB to make them incident on the mirror 22, and reflecting the gate light beam GB to make it incident on the mirror 22.

The mirror 22 has optical characteristics of reflecting all of the recording light beam RB and the playback light beam PB passed through the mirror 23, and the gate light beam GB reflected by the mirror 23 to make the light beams incident on the objective lens 21 and, as will be described later, transmitting the recording light beam RB and the playback light beam PB reflected by the optical disk DK and the detection light L, and making the light beams incident on the wavelength separating mirror 26.

As each of the mirrors 22 and 23, concretely, it is preferable to use a so-called half mirror or a diachronic mirror having wavelength selectivity or the like.

Further, the wavelength separating mirror 26 has optical characteristics of transmitting the recording light beam RB and the playback light beam PB passed through the mirror 22 so that the beams are incident on the multidivision light detector 27, and reflecting the detection light L similarly passed through the mirror 22 toward the spatial filter 28.

The operation will now be described.

First, an embodiment of the case of recording information onto the optical disk DK will be described with reference to FIGS. 2A, 2B, and 2C, and FIG. 3. Members functioning in the case of recording information onto the optical disk DK are members constructing the information recording/playback apparatus S except for the spatial filter 28, the light detector 29, and the playback unit 30.

When recording information Sr to be recorded on the optical disk DK is input from the outside at the time of information recording, the coding unit 34 performs a formatting process, a coding process, and the like necessary for recording information onto the optical disk DK for the recording information Sr under control of the CPU 32 using a control signal Sce, and outputs the resultant information as coded information Srr to the first light source 24.

The coded information Srr as digital information is modulated so that the recording light beam RB is emitted in correspondence with "1" or "HIGH" in the coded information Srr, and the transparency region 10 (refer to FIGS. 2A, 2B, and 2C) is formed in the photochromic layer 2.

Next, the first light source 24 generates the recording light beam RB whose intensity changes in correspondence with a change in the modulated coded information Srr, and the recording light beam RB is incident on the optical disk DK via the mirrors 23 and 22.

Concurrently, the second light source 25 emits the gate light beam GB of single intensity, and the gate light beam GB is incident on the optical disk DK together with the recording light beam RB via the mirrors 23 and 22.

When the optical disk DK is irradiated with the gate light beam GB and the recording light beam RB whose intensity is modulated, the transparency region 10 is formed in the photochromic layer 2 in the position corresponding to "1" or "HIGH" in the coded information Srr on the basis of the principles described by using FIGS. 2A and 2B.

Concurrently with formation of the transparency region 10, the recording light beam RB provided for forming the transparency region 10 is reflected by the reflection layer 4 (refer to FIG. 1) in the optical disk DK. When the plane of polarization is rotated at the time of reflection, the recording light beam RB passes through the mirror 22, and further, the wavelength separating mirror 26, and is emitted to the multidivision light detector 27.

The multidivision light detector 27 generates a detection signal Spe used for generating an error signal (specifically, a tracking error signal and a focus error signal) used for position control in the direction parallel to the rotating surface of the optical disk DK, and position control in the direction perpendicular to the rotating surface, of a focal position of the recording optical beam RB and the gate light beam GB by a known error signal generating method such as an astigmatism method or a knife edge method, and outputs the detection signal Spe to the error signal detecting unit 31.

The error signal detecting unit 31 generates the tracking error signal and the focus error signal on the basis of the detection signal Spe under control of the CPU 32 using a control signal Scr, and outputs each of the tracking error signal and the focus error signal as an error signal Se to the driving unit 33.

The driving unit 33 generates a drive signal Sdr for driving the objective lens 21 via the actuator 20 on the basis of the tracking error signal and the focus error signal included in the error signal Se, and outputs the drive signal Sdr to the actuator 20 under control of the CPU 32 using a control signal Scd.

On the basis of the drive signal Sdr, the actuator 20 drives the objective lens 21 in the direction parallel to the rotating surface of the optical disk DK and the direction perpendicular to the rotating surface, thereby performing tracking servo control and focus servo control to set the value of the tracking error signal and the value of the focus error signal to zero. By the tracking servo control and the focus servo control, the focal point of each of the recording light beam RB and the gate light beam GB can be properly controlled.

By the above-described operation of the members, the transparency region 10 is formed in the photochromic layer 2 in accordance with the principles shown in FIGS. 2A and 2B. Consequently, the information pit P is formed in the surface on the side of the photochromic layer 2 of the fluorescent layer 3 in the position corresponding to the recording information Sr, and the recording information Sr is recorded on the optical disk DK.

An embodiment of the case of playing back information from the optical disk DK in which the information pit P is formed by the above-mentioned recording operation will now be described by using FIGS. 2A, 2B, and 2C, and FIG. 3. The members functioning in the case of recording information onto the optical disk DK are the members of the information recording/playback apparatus S except for the coding unit 34 and the second light source 25.

At the time of playing back information, first, the first light source 24 emits the playback light beam PB having predetermined constant playback intensity so that the playback light beam PB is incident on the optical disk DK via the mirrors 23 and 22.

When the optical disk DK is irradiated with the playback light beam PB having constant intensity, on the basis of the principles described by using FIGS. 2B and 2C, the detection light L as fluorescent light of the fluorescent layer 3 is generated from the information pit P formed in the surface of the fluorescent layer 3.

After that, the detection light L passes through the mirror 22, is reflected by the wavelength separating mirror 26, passes through the spatial filter 28, and enters the light detector 29.

The light detector 29 generates a detection signal Sp corresponding to the incident detection light L, and outputs the detection signal Sp to the playback unit 30.

Under control of the CPU 32 using a control signal Scp, the playback unit 30 generates playback information Sout corresponding to information carried in the information pit P on the basis of the detection signal Sp, and outputs the playback information Sout to the outside.

On the other hand, concurrently with the process of generating the playback information Sout, the playback light beam PB incident on the optical disk DK is reflected by the reflection layer 4 (refer to FIG. 1). When the plane of polarization is rotated at the time of reflection, the playback light beam PB passes through the mirror 22, and further, the wavelength separating mirror 26, and enters the multidivision light detector 27.

The multidivision light detector 27 generates the detection signal Spe used for generating an error signal used for controlling the focal point of the playback light beam PB by a known error signal generating method such as an astigmatism method or a knife edge method, and outputs the detection signal Spe to the error signal detecting unit 31, in a manner similar to the information recording operation.

The error signal detecting unit 31 generates the tracking error signal and the focus error signal on the basis of the detection signal Spe under control of the CPU 32 using the control signal Scr, and outputs each of the tracking error signal and the focus error signal as the error signal Se to the driving unit 33.

The driving unit 33 generates the drive signal Sdr for driving the objective lens 21 via the actuator 20 on the basis of the tracking error signal and the focus error signal included in the error signal Se, and outputs the drive signal Sdr to the actuator 20 under control of the CPU 32 using the control signal Scd.

On the basis of the drive signal Sdr, the actuator 20 drives the objective lens 21 in the direction parallel to the rotating surface of the optical disk DK and the direction perpendicular to the rotating surface, thereby performing tracking servo control and focus servo control to set the value of the tracking error signal and the value of the focus error signal to zero. By the tracking servo control and the focus servo control, the focal point of the playback light beam PB can be properly controlled.

By the above-described operation of the members, the detection light L passed through the transparency region 10 formed in the photochromic layer 2 is detected in accordance with the principles shown in FIGS. 2A, 2B, and 2C. In such a manner, the information recorded as the information pit P is played back.

As described above, in the operation of the information recording/playback apparatus S of the embodiment, the photochromic layer 2 except for the transparent region 10 formed by being irradiated with the recording light beam RB functions as a mask against the playback light beam PB. Consequently, information recorded on the optical disk DK can be played back by the spatial frequency higher than the cut-off frequency determined by the wavelength of the playback light beam PB and the numerical aperture of the objective lens 21. Thus, information can be recorded and played back at higher recording density.

The higher the energy in the direction perpendicular to the optical axis of the recording optical beam RB is, the higher the transparency of the photochromic layer 2 to the playback light beam PB becomes. Consequently, the effective diameter of a light spot formed by the recording light beam RB can be reduced, so that information can be recorded and played back at higher density.

Since the transparency of the photochromic layer 2 changes when the photochromic layer 2 is simultaneously irradiated with both the recording light beam RB and the gate light beam GB, and the photochromic layer 2 does not change at the time of playback, information can be stably played back without deterioration of recorded information.

Further, information can be recorded only by changing the transparency of the photochromic layer 2 without changing the physical characteristics of the fluorescent layer 3, so that the recording power necessary for the recording light beam RB at the time of recording information can be reduced, and complication of the configuration and increase in the manufacturing cost of the information recording/playback apparatus S can be prevented.

Further, by playing back recorded information by receiving the detection light L emitted from the fluorescent layer 3 irradiated with the playback light beam PB, information can be played back at a signal-to-noise ratio (S/N ratio) higher than that in the case of playing back information by detecting a change in the angle of polarization or the like in the playback light beam PB without consideration of destroy of a pit in the fluorescent layer 3. Thus, stability and reliability at the time of information playback can be improved.

Since the photochromic layer 2 is used for forming the transparency region 10, a layer for the transparency region 10 can be formed in the optical disk DK by a simple manufacturing process.

Further, since the detection light L from the fluorescent layer 3 formed by photoluminescence material or a fluorescent dye is used for information playback, information recorded at higher density can be played back.

Moreover, since the reflection layer 4 is further provided on the side opposite to the photochromic layer 2 relative to the fluorescence layer 3, not only the detection light L but also a part of the playback light beam PB reflected by the reflection light can be also detected. The intensity of light for playback obtained from the optical disk DK can be increased.

Although the case of forming the information pit P by forming the transparency region 10 in the photochromic layer 2 in the position corresponding to "1" or "HIGH" in the coded information Srr has been described in the foregoing embodiment, the invention can be also applied to the case of recording information by forming the transparency region 10 (corresponding to "1" or "HIGH" in the coded information Srr) in the position other than the position corresponding to "0" or "LOW" in the coded information Srr.

In this case, the photochromic layer has to be formed by material having optical characteristics such that the material is transparent to the playback light beam PB before being irradiated with the recording light beam RB, and at the time of recording information, becomes opaque to the playback light beam PB when being irradiated with the gate light beam GB and the recording optical beam RB. The material to be employed for the photochromic layer in this case has to have the optical characteristics such that the higher the energy is in correspondence with an energy distribution in the direction perpendicular to the optical axis in the recording light beam RB, the lower the transparency to the playback light beam PB becomes.

In this case as well, as a result, the photochromic layer in the position corresponding to "1" or "HIGH" in the coded information Srr becomes transparent to the playback light beam PB, so that a conspicuous effect similar to that in the foregoing embodiment can be also produced.

Further, the material of the photochromic layer 2 is not limited to the above-mentioned photochromic material, but any material can be used as long as it has optical characteristics such that the higher the energy is in correspondence with an energy distribution in the direction perpendicular to the optical axis in the recording light beam RB, the higher (or lower) the transparency to the playback light beam PB becomes.

As the material of the fluorescent layer 3, any material can be used as long as it generates, as detection light L, light of frequency different from the frequency of the playback light beam PB when the material is irradiated with the playback light beam PB.

It is also possible to record a program for executing the above-mentioned recording/playback processes in a flexible disk or to obtain and record the program via a network such as the Internet, and read and execute the program by a general computer such as a microcomputer. In such a manner, the computer can be made function as the CPU 32 in the embodiment.

It should be understood that various alternatives to the embodiments of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2003-203902 filed on Jul. 30, 2003 including the specification, claims, drawings and abstract is incorporated herein by reference in its entirety.

What is claimed is:

1. An information recording medium on which information is recorded by irradiation of a recording light beam for information recording, and from which said recorded information is played back by irradiation of a playback light beam for information playback which does not pass through a transparency changing layer before its transparency is changed by irradiation of said recording light beam, but passes through the transparency changing layer after its transparency is changed, comprising:

said transparency changing layer whose transparency to said playback light beam increases as energy of the recording light beam increases in correspondence with an energy distribution in the direction perpendicular to an optical axis in the recording light beam when said transparency changing layer is irradiated by said recording light beam while said transparency changing layer is irradiated by a control light beam for controlling a change in the transparency of said transparency changing layer, and whose changed transparency to said playback light beam is also maintained after end of the irradiation with said recording light beam; and a light emission layer for emitting, as detection light, light of a frequency different from the frequency of the playback light beam when being irradiated with said playback light beam, wherein said transparency changing layer and said light emission layer are formed in order from the side irradiated with said recording light beam and said playback light beam.

2. An information recording medium on which information is recorded by irradiation of a recording light beam for information recording, and from which said recorded information is played back by irradiation of a playback light beam for information playback which passes through a transparency changing layer before its transparency is changed by irradiation of said recording light beam but does not pass through the transparency changing layer after its transparency is changed, comprising:

said transparency changing layer whose transparency to said playback light beam decreases as energy of the recording light beam increases in correspondence with an energy distribution in the direction perpendicular to an optical axis in the recording light beam when said transparency changing layer is irradiated by said recording light beam while said transparency changing layer is irradiated by a control light beam for controlling a change in the transparency of said transparency changing layer, and whose changed transparency to said playback light beam is also maintained after end of the irradiation with said recording light beam; and a light emission layer for emitting, as detection light, light of a frequency different from the frequency of the playback light beam when being irradiated with said playback light beam, wherein said transparency changing layer and said light emission layer are formed in order from the side irradiated with said recording light beam and said playback light beam.

3. An information recording medium according to claim 1, wherein said transparency changing layer is a photochromic layer formed by photochromic material.

4. An information recording medium according to claim 1, wherein said light emission layer is formed by either photoluminescence material or fluorescent dye.

5. An information recording medium according to claim 1, further comprising a reflection layer for reflecting said playback light beam on the side opposite to said transparency changing layer, of said light emission layer.

6. An information recording apparatus for recording information onto an information recording medium according to claim 1, comprising:

a modulating device which modulates intensity of said recording light beam on the basis of information to be recorded;

a first light emitting device which irradiates a position on said information recording medium on which said information is to be recorded with said control light beam in order to change transparency of said transparency changing layer formed in the position; and a second light emitting device which irradiates said transparency changing layer irradiated with said control light beam with said recording light beam whose intensity has been modulated.

7. An information playing back apparatus for playing back information recorded on an information recording medium according to claim 1, comprising:

a light emitting device which emits said playback light beam to said light emission layer in the position on said information recording medium in which said information to be played back is recorded, said playback light beam passing through said transparency changing layer;

a detecting device which receives said detection light generated from said light emission layer irradiated with said playback light beam, and generates a detection signal; and a playback device which plays back said recorded information on the basis of said generated detection signal.

8. An information recording method for recording information onto an information recording medium according to claim 1, comprising:

a modulating process of modulating intensity of said recording light beam on the basis of information to be recorded;

a first light emitting process of irradiating a position on said information recording medium on which said information is to be recorded with said control light beam in order to change transparency of said transparency changing layer formed in the position; and a second light emitting process of irradiating said transparency changing layer irradiated with said control light beam by said recording light beam whose intensity has been modulated.

9. An information blayback method for playing back information recorded on an information recording medium according to claims 1, comprising:

a light emitting process of emitting said playback light beam to said light emission layer in the position on said information recording medium in which said information to be played back is recorded, said playback light beam passing through said transparency changing layer;

a detecting process of receiving said detection light generated from said light emission layer irradiated with said playback light beam, and generating a detection signal; and a playback process of playing back said recorded information on the basis of said generated detection signal.

10. An information recording medium on which a program is recorded so that it can be read by a computer, said program being a recording program for causing a recording computer included in an information recording apparatus for recording information onto an information recording medium according to claim 1 to function as:

a modulating device which modulates intensity of said recording light beam on the basis of information to be recorded;

a first light emitting device which irradiates a position in said information recording medium on which said information is to be recorded with said control light beam in order to change transparency of said transparency changing layer formed in the position; and a second light emitting device which irradiates said transparency changing layer irradiated with said control light beam with said recording light beam whose intensity has been modulated.

11. An information recording medium on which a program is recorded so that it can be read by a computer, said program being a playback program for causing a playback computer included in an information playback apparatus for playing back information recorded on an information recording medium according to claims 1 to function as:

a light emitting device which emits said playback light beam to said light emission layer in the position on said information recording medium in which said information to be reproduced is recorded, said playback light beam passing through said transparency changing layer;

a detecting device which receives said detection light generated from said light emission layer irradiated with said playback light beam, and generates a detection signal; and a playback device which plays back said recorded information on the basis of said generated detection signal.

* * * * *